United States Patent [19]
Tannenberger et al.

[11] Patent Number: 5,328,779
[45] Date of Patent: Jul. 12, 1994

[54] FUEL CELL BATTERY AND SOLID ELECTROLYTE FUEL CELLS THEREFORE

[75] Inventors: Helmut Tannenberger, Le Chateau de St. Croix; Heiko Gruner, Beinwil a. See, both of Switzerland

[73] Assignee: Medicoat AG, Niederrohrdorf, Switzerland

[21] Appl. No.: 927,427

[22] PCT Filed: Dec. 13, 1990

[86] PCT No.: PCT/EP90/02175
§ 371 Date: Aug. 3, 1992
§ 102(e) Date: Aug. 3, 1992

[87] PCT Pub. No.: WO91/11829
PCT Pub. Date: Aug. 8, 1991

[30] Foreign Application Priority Data
Feb. 1, 1990 [DE] Fed. Rep. of Germany ....... 4002951

[51] Int. Cl.⁵ .............................................. H01M 8/12
[52] U.S. Cl. ........................................ 429/32; 429/37; 429/40
[58] Field of Search ........................ 429/32, 34, 37, 40

[56] References Cited

U.S. PATENT DOCUMENTS

| | | | |
|---|---|---|---|
| 3,253,953 | 5/1966 | Turner et al. ...................... | 429/37 |
| 3,460,991 | 8/1969 | White . | |
| 3,464,861 | 9/1969 | Williams et al. . | |
| 3,507,705 | 4/1970 | Tannenberger et al. . | |
| 3,861,959 | 1/1975 | Cadiou . | |
| 4,275,126 | 6/1981 | Bergmann et al. . | |
| 4,604,331 | 8/1986 | Louis ................................ | 429/37 X |
| 4,721,556 | 1/1988 | Hsu . | |
| 5,171,646 | 12/1992 | Rohr ................................. | 429/32 X |

FOREIGN PATENT DOCUMENTS

| | | |
|---|---|---|
| 2747467 | 2/1979 | Fed. Rep. of Germany . |
| 1403729 | 6/1965 | France . |
| 63-58766 | 3/1988 | Japan . |
| 1227362 | 9/1989 | Japan . |
| 490742 | 6/1970 | Switzerland . |
| 515622 | 12/1971 | Switzerland . |
| 1252254 | 11/1971 | United Kingdom . |

*Primary Examiner*—Stephen Kalafut
*Attorney, Agent, or Firm*—Spencer, Frank & Schneider

[57] ABSTRACT

Avoiding the use of porous ceramic bearing structures, the proposal is for a 3-layer electrolyte fuel cell element, one electrode (1) of which is at the same time the bearer plate for the active cell element (12, 2, 3), is integrated via component (4) into the frame structure for a cell battery made up of individual elements, and in which the mechanical closing force between the frame structure and the active cell element is released with the aid of a spring-loaded region (11), in order not to expose the thin electrolyte layer (2) to thermally induced mechanical stresses. The active cell element, a combination of two porous and metallic electrodes (1, 3) with a gastight oxide electrolyte layer (2), are preferably produced by the vacuum plasma spray process.

22 Claims, 3 Drawing Sheets

FUEL CELL BATTERY AND SOLID ELECTROLYTE FUEL CELLS THEREFORE

BACKGROUND OF THE INVENTION

1. Field of The Invention

The invention relates to a fuel-cell element which comprises a combination of two porous and metallic electrodes with a gastight and oxidic electrolyte layer, and a process for its manufacture.

2. Description of The Related Art

Fuel cells are interesting devices for converting chemical energy directly into electrical energy. Theoretically, substantially higher conversion rates are achievable than via the Carnot cycle process. A very simple hydrogen/oxygen cell was put forward as long as 150 years ago by R. Grove. Since that time the problem has been to react fuel (for example $CH_4$) electrochemically with oxygen (air) in such a way that the energy of oxidation of carbon monoxide to $CO_2$ and of the hydrogen component to $H_2O$ is directly converted into electrical energy. In this connection, the following reactions occur at the cell electrodes:

Cathode: 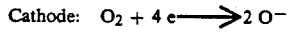 $O_2 + 4e \longrightarrow 2O^-$

Anode: 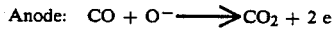 $CO + O^- \longrightarrow CO_2 + 2e$

 $H_2 + O^- \longrightarrow H_2O + 2e$

This requires a gastight separation of the coreactants by means of a barrier, the electrolyte layer, which is permeable only to oxygen ions but is electrically insulating. Electrical connection has in turn to be made with both sides of said barrier in such a way that the supply and removal of the electron currents is ensured in as loss-free a manner as possible. At the same time, good accessibility of the electrolyte surfaces for the gaseous coreactants (CO and $H_2$ on the anode side, $O_2$ on the cathode side) and removal of the reaction products ($H_2O$ vapor and $CO_2$) are required.

For most fuels, carbon monoxide and hydrogen have first to be produced via preliminary thermal reactions (reforming), for example for $CH_4$ via the reactions:

 $H_2O + CH_4 \rightleftharpoons CO + 3H_2$

 $CO_2 + CH_4 \rightleftharpoons 2CO + 2H_2$

For the invention described below, it is irrelevant whether the starting gases for the electrochemical reaction are produced simultaneously inside the fuel cell or outside and upstream of it, or whether pure hydrogen is directly converted into electrical energy.

At this point it should also be stated that the process can also be reversed with the fuel cell element according to the invention. This relates, in particular, to the electrochemical decomposition of $H_2O$ vapor into $H_2$ and $O_2$, or of other gaseous oxides, for the purpose of fuel synthesis accompanied by power consumption.

Many types of fuel cell have already been proposed. In various versions, an attempt has been made to overcome the discrepancy between the theoretical conversion rates and the values achieved in practice. Real electrochemical reaction rates are limited by mass transport, by electron conduction, by the physical properties of the cell element materials used and by geometrical effects. A key role is played by the two porous electrodes, whose structural and material long-term stability has a very critical effect on the performance of the cell element.

Among the many proposed cells, high-temperature fuel cells with solid electrolyte are of particular interest. The application temperatures of this cell type are between 700° and 1100° C. They can therefore be fed directly with air and natural gas or other gaseous hydrocarbons. A cell temperature which is adequate for an internal reforming process for CO is desirable. In addition to electricity, usable heat can also be generated simultaneously by a chemical combustion, a very important factor for the total energy balance. An adjustable proportion of the fuel is burnt, and the entire cell is thereby simultaneously kept at a temperature level which is favorable for the electrochemical conversion.

The solid electrolyte preferably used for this type of cell is cubic stabilized $ZrO_2$, a material which conducts oxygen ions at fairly high temperatures with very good electrical resistance for electron conduction.

Since an individual element only generates a low electrical voltage, many individual elements are assembled to form batteries. The individual cells have to be electrically connected in series with one another, using a material which conducts electrons very well and has as low a contact resistance as possible. Inside the cell battery, air and fuel must be able to flow through the individual elements in a manner which is optimum for the system, with strict gastight separation of the two coreactants. Such "cell stacks" furthermore need external supply and removal lines for current and gases. Particular problems exist for high-temperature cell stacks since the essential component, namely the solid electrolyte, is a ceramic material. Despite very careful matching of materials and production methods, it has hitherto not been possible to withstand in the longer term the mechanical loadings always arising during operation because of thermal gradients and different coefficients of expansion. Individual electrolyte elements break under the mechanical stresses produced, the gastightness is gradually lost and the efficiency drops. Rising temperatures resulting from the chemical fuel reaction destroy the cell stack.

Although small batteries were initially operated successfully, all the stacks produced in the 70s have been abandoned. Because of new ceramics technology, better production possibilities are now emerging without, however, being able to overcome the conflicting properties relating to cell physics and cell mechanics: U.S. Pat. No. 3,460,991 describes, for example, a solid-electrolyte cell battery in tubular form. A similar construction is described by Westinghouse, 1979, in a publication entitled "Thin Solid Fuel Cell/Battery Power Generation System", a porous ceramic tube being used as the actual support structure. Using various coating methods, the porous cathode, the dense electrolyte layer, the porous anode and additional electrically conducting and electrically insulating layers are built up one after another. In Japan, too, a tubular battery having an output power of 1 kW was successfully built and tested. As described in a publication of the Electrochemical Laboratory, Ibaraki 305, Japan, an attempt was made to build up at least all the cell elements with the aid of the thermal spraying technique instead of various coating methods. The Japanese solution also differs from the American one in that porous $Al_2O_3$ tubes are used instead of $ZrO_2$ ceramic. Simultaneously, the Japanese attempted to produce a plurality of cells in series on one ceramic tube, whereas each ceramic tube is only one cell element in the Westinghouse model. Both designs have the disadvantage that deficiencies have to be borne in the cell performance because of inadequate gastightness.

In order to increase the compactness of the electrolyte and simultaneously raise the packing density compared with batteries built up from tubes, solutions using planar technology have been proposed. In a publication issued by Argonne National Laboratory, 1983, entitled "Advanced Fuel Cell Development," a monolithic design is described with honeycomb openings for the gas transport planes. In this case, pressed and sintered electrolyte structures are joined to the metallic electrode plates with the aid of high-temperature fusion, a design which implies all the mechanical difficulties. Attempts to make advances in this connection are to be found in U.S. Pat. No. 4,721,556. A very compact cell battery is produced by using self-supporting thin electrolyte plates which have been manufactured by plasma spraying under controlled deposition conditions. However, the required gastightness can only be ensured by means of high-temperature sintering, in which process a flattening of the plates and a surface smoothing are simultaneously achieved. The porous electrodes are then applied by the flame spraying process and a plurality of such cell elements is supplemented with the aid of structured metal plates (interconnector) to form batteries. Contrasted with the advantage of an optimum packing density is the disadvantage of extreme mechanical stress loading if gastightness is to be guaranteed in this sandwich construction. The cell construction impedes the gas flows. Furthermore, individual element testing before producing the battery is not possible. And if an individual element is malfunctioning during operation, repair is not possible.

The object of the present invention is therefore to provide a high-temperature solid-electrolyte fuel cell of the type described at the outset which does not have the disadvantages mentioned, is simple and inexpensive to manufacture, can be tested individually before connection in series and can be linked to form cell stacks without mechanical stresses endangering the long-term operation.

SUMMARY OF THE INVENTION

The object is achieved according to the invention in that the cell elements are designed in a form which, after each individual cell has been tested, makes it possible to construct both tubular stacks and also batteries using planar technology. According to the invention, a design is achieved which can be optimized for the mass flows of air (oxygen), fuel (hydrogen) and reaction products (exhaust gas) in the widest variety of arrangements. Specifically, it is found that, depending on the operating temperature of the fuel cell and the fuel gas used, the air mass flow should have five to ten times the volume of the fuel gas flow in order to ensure a balanced temperature distribution inside the cell battery accompanied by high cell efficiency.

In as material-saving a manner as possible, the cell structure is built up in such a way that at least 85% of the fuel mass flow is electrochemically converted. About 15% is chemically burnt in order to establish inexpensively the optimum operating temperature for the high-temperature cell elements (oxygen ion conductivity in the electrolyte) and to allow the internal reforming reactions (CO production) to proceed independently. The heat liberated has to be allowed for in the total balance.

According to the invention, the chemical combustion of the set amount of the fuel mass flow takes place in a uniformly distributed manner over the electrolyte surface. This avoids unacceptable temperature gradients in the cell elements and optimizes the conduction of the internal electrical currents.

According to the invention a process is used for the production of the active cell elements. One or both of the porous electrodes and the electrolyte layer can be produced at the same time without interrupting the deposition process and simultaneously for a plurality of elements. Advantageously, the electrolyte layer produced by the process according to the invention has a layer thickness optimized for the oxygen ion conductivity and simultaneously the necessary gastightness. The set residual leakage rate is below $10^{-6}$ mbar.l/cm.s, measured with helium.

The porosity of the electrodes manufactured according to the invention is set for an optimum gas transport. They have adequate electrical transverse conductivity, which is necessary for a uniform electrochemical conversion per unit surface area.

An essential feature of the fuel cell according to the invention is that no porous ceramic is used as supporting element. A metal structure is the support for the active cell and simultaneously one electrode. It ensures the mechanical robustness of the individual cell and makes possible the stress-free build-up of cell batteries from individual elements. Embedded in a sturdy metal frame is a porous metal region which supports the electrolyte. Nevertheless, metal frame and porous metal part jointly form one electrode of the cell element according to the invention. It may optionally be the air or the fuel electrode. A cell stack is produced by connecting the cell anode of one element in series with the cell cathode of the next individual cell. This design joins the individual elements mechanically, interconnects them electrically and hermetically separates the fuel gas flow from the air flow. The cell according to the invention is consequently clearly delineated from the solution described in Swiss Patent No. 515 622, in which the entire cell battery is simultaneously built up on a porous metal plate. The individual cell electrodes are linked to one another and mutually delineated by electrically insulating and electrically conducting layers. In this thin-film-technique design, mechanical stress problems are directly implied. In the case of thermal cycling stress, relief can only take place via cracks in the electrolyte layer, and for this reason a working cell battery in accordance with this proposal has never been constructed.

A further feature of the invention is the combination of a thick and porous metal support body with a thin and dense electrolyte layer to minimize the stresses at this critical metal/ceramic boundary. Even if metal and ceramic have the same coefficient of thermal expansion, mechanical stresses occur at the metal/ceramic junction due to temperature gradients and as a consequence of the coefficients of thermal expansion of the two materials not being identically temperature-dependent. Said mechanical stresses are, however, cushioned by the porous metal support, backed up by the mechanical decoupling according to the invention between active cell region and frame structure. At the same time, with its established lamellar structure, the thin electrolyte layer according to the invention, which is applied by the vacuum plasma spraying process, is flexible enough to withstand the mechanical residual loading permanently without crack formation.

BRIEF DESCRIPTION OF THE DRAWINGS

The invention is explained in greater detail below by reference to the drawings.

DESCRIPTION OF THE PREFERRED EMBODIMENTS

Figure 1:
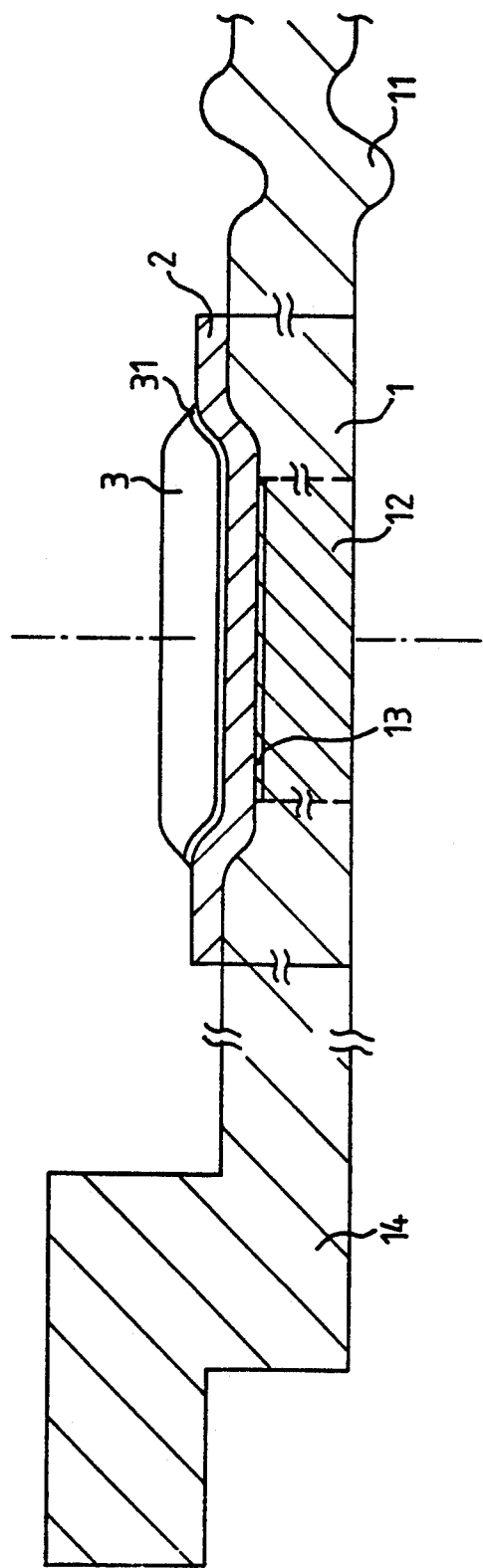
FIG. 1 shows a section through the cell element according to the invention.

A fuel cell element shown diagrammatically in FIG. 1 is a 3-layer combination in accordance with the invention in which (1) denotes the metallic support which simultaneously takes on an electrode function. It may be the cathode or the anode of the fuel cell, the choice of material being determined not only by the electrical and thermo-mechanical conditions but by the atmosphere on the exposed outside of this support electrode (1): reducing on the fuel side as a consequence of the hydrogen component and oxidizing on the oxygen-containing gas, e.g., air side as a consequence of the oxygen component.

Since support electrode (1) has a support function its thickness was specified on the basis of the mechanical requirements and it simultaneously has the required and adequate electrical transverse conductivity. Electrical reverse currents inside the fuel element as a consequence of inhomogeneous. electrochemical current generation over the electrolyte area are eliminated. Element (12) denotes a region or part of the metallic support plate (1) which has a set porosity, i.e., porous region (12). It has been optimized from the points of view of a fast gas supply to the electrolyte surface and the best possible electrical contact to the electrolyte surface. As a result of the choice of porosity, taking the existing metal/electrolyte combination into account, the electron acceptance as a result of oxygen ion formation, on the one hand, and the electron release during the electrochemical fuel oxidation, on the other hand, are favorably affected. For the same reasons, a boundary layer (13), i.e., thin additional layer (13) can be inserted between the porous region (12) of metal electrode (11), and an electrolyte layer (2) in the fuel cell according to the invention. This may additionally have the purpose of catalytically accelerating the electrochemical reactions as a result of boundary layer effects. For the same reasons, a thin additional layer (31) may also be inserted between the electrolyte layer (2) and a porous counterelectrode (3). If support electrode (1) is a cathode, boundary layer (13) is preferably composed of perovskite.

Thermal spraying is suitable for the production of the porous region (12) of the metal support electrode (1). Preferably, a vacuum plasma spraying technique (VPS) is used. The particle size fractionation for the spraying powder is chosen within wide limits in such a way that the flame energy melts only the fine constituent particles, only softens the middle particle range, and hardly affects the coarse particles at all. The latter are included in the sprayed layer as hard particles. Together with the softened particles of the middle powder fraction, they are cemented with the aid of the molten fine particles to form a sturdy porous structure for porous region (12). The particle size fractionation of the spraying powder determines the porosity of the sprayed layer. Only those material-free layer regions count which are joined to one another. The gas transport takes place through these channels.

The electrolyte layer (2) is preferably applied by the VPS process to metal support electrode (1). It is known that particularly dense oxidic, i.e., oxide, sprayed layers can be manufactured by this process. This can be inferred, for example, from the publication entitled "Dense oxide coatings", Proceedings ATTAC-1988 Conf., Osaka Japan. With the aid of the spraying powder choice and the coating parameters, the electrolyte layer (2) is deposited in such a way that a firmly adhering, dense lamellar structure is produced. Its residual leakage rate, measured with helium, is below $10^{-6}$ mbar.l/cm.s, regardless of the chosen layer thickness.

The choice of material for the electrolyte layer is subject to the laws of oxygen ion conductivity. Preferably, ceramics, such as $Y_2O_3$-stabilized $ZrO_2$ which is entirely present in the cubic phase, and which is stable towards phase transformation, is used. It is important to emphasize here that the invention is independent of the choice of the electrolyte. It may also be extrapolated to materials which permit oxygen ion conductivity at lower temperatures than does $ZrO_2$. To reduce the melting point of $ZrO_2$ and thereby ease the deposition condition for the VPS coating, 3% of $Al_2O_3$, for example, may be added to the zirconium oxide in the melting process. A similar procedure is conceivable for other additives in order to make possible oxygen ion conductivity at lower temperatures. The more the temperature required for adequate oxygen ion conductivity can be reduced, the greater the choice of material for the metallic support electrode (1) and for the counterelectrode (3).

The electrolyte layer (2) is deposited to extend beyond the edge of the porous region (12) of the metallic support body. This ensures the electrical insulation of the two electrodes (1) and (3). However it terminates appreciably before reaching mechanical decoupling or spring-loaded region (11) of the metallic support electrode (1) which surrounds active cell element (12, 2 and 3) in order to even out mechanical stresses. Edge region (14) denotes the part of the metallic support electrode (1) which is used to construct a fuel cell battery. It is substantially thicker and constructively matched to the mechanical requirements relating to the leakproof joining of individual fuel cell elements. The purpose of the spring-loaded or mechanically decoupled region (11) is consequently understandable. The mechanical loadings thermally induced in the gastight individual fuel cell joints must be kept away from the active cell region (12, 2, 3).

In FIG. 1, the spring-loaded region (11) is drawn as a spring element. Other designs are conceivable instead of this.

Support electrode (1) may be a round or a rectangular plate, or be constructed as a tubular part. As an essential inventive element, the active cell element or region (12, 2, 3) is always mechanically decoupled from the mounting by region (11).

The porous region (12) may also be manufactured by sintering technology. Just as a powder of support material (1) is used in the case of manufacture by the VPS process, fine metal spheres of the same alloy are used when sintering the region (12) into the metallic support plate (1). Sintering temperature, molding pressure and sphere diameter are matched to one another so as to achieve the required porosity.

All the known high-temperature alloys are suitable for the metallic support (1): If connected as cathode, particularly oxidation-resistant materials and if used as anode, alloys which are stable in a reducing atmosphere.

Figure 2:
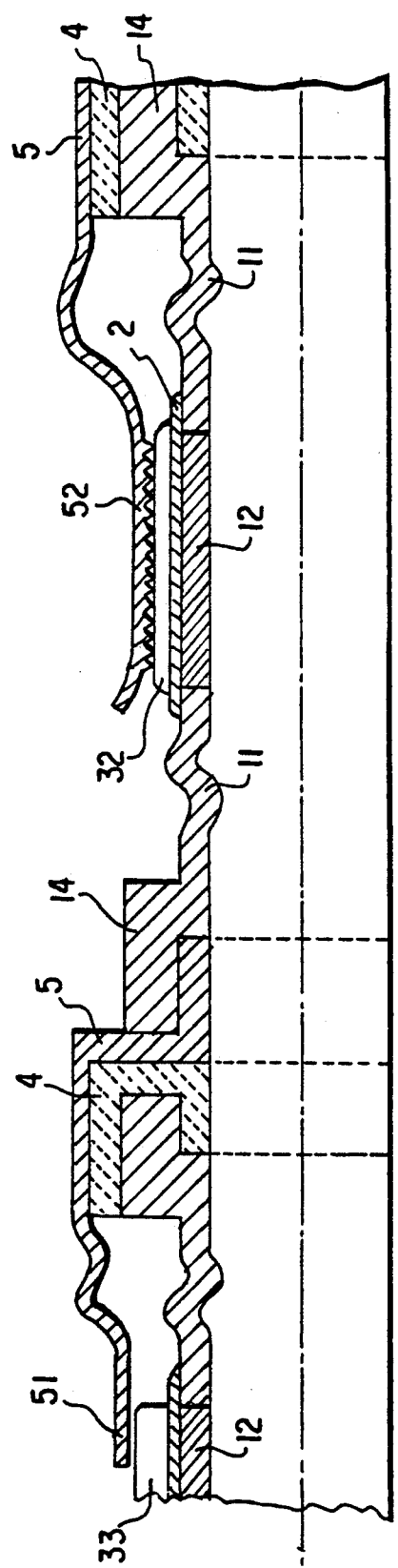
FIG. 2 shows a fuel cell battery built up in tubular form from individual cells in accordance with FIG. 1.

FIG. 2 shows a cell stack of a fuel cell battery built up from tubular fuel cells. Insulating elements (4) provide electrical insulation. The mechanical decoupling of the active cell regions (12, 2, 3) from contact assemblies (51, 4, 5) and joints (14, 4, 5) is also transferred to the sprung parts (51), such as contacting springs (52, 53). Via the latter and the a contact part or sturdy region (5), the counterelectrode (3) of one cell element is electrically connected in series with the support electrode (1) of the next. Edge regions (14) of the individual fuel cells are electrically isolated by insulating element (4). To match the coefficients of thermal expansion, the insulating element (4) are preferably made of $Si_3N_4$. To connect the edge individual cells, the region (14) of the metallic support plate (1) is connected to the insulating elements (4) and the latter is connected to a contact part (5), which is in turn connected in a gastight manner to edge region (14) of the next element. All the connecting parts are sturdy enough to permanently withstand the mechanical stresses due to the thermal cycling load. The mechanical decoupling region (11) prevents the transmission of the mechanical stresses to the active zones.

If the counterelectrode (3) has sufficient electrical transverse conductivity (for example (3) in FIG. 2), contacting with the aid of the sprung part (51) is limited to its edge region. In the case where the counterelectrode (3) is of very thin construction (for example (3) in FIG. 2), the entire surface is uniformly contacted electrically with the aid of the contact spring (52).

Without being shown in detail, a tubular battery 10 may comprise many individual cells. At the same time, a plurality of tubes can be interconnected to form an electrochemical power station. The total number of individual elements depends on the electrical power necessary.

Figure 3:
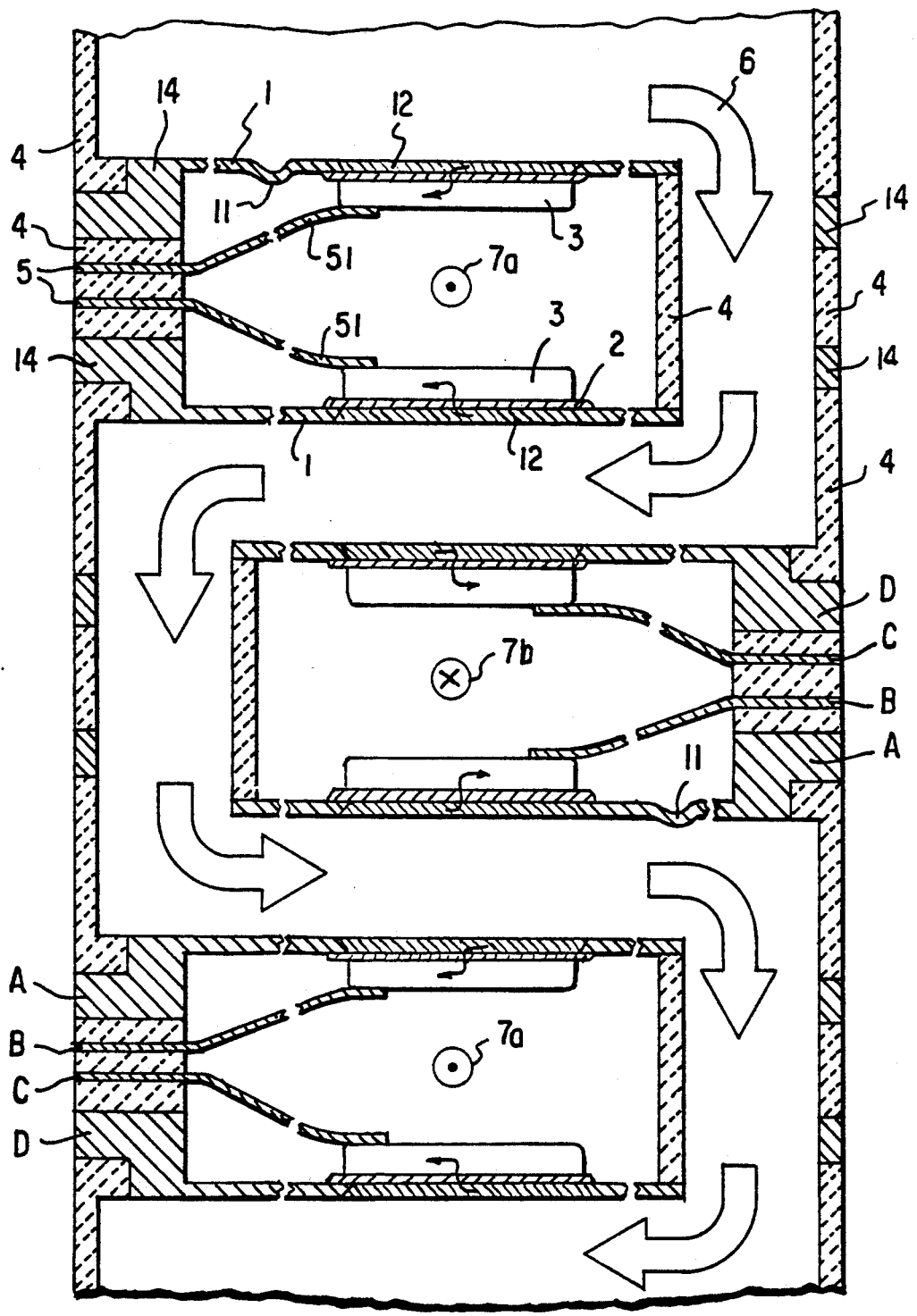
FIG. 3 shows a fuel cell battery in planar technology, also comprising a series circuit of individual cells in accordance with FIG. 1.

FIG. 3 shows a cell stack built up in planar technology from individual cells according to the invention. The active cell zones are again decoupled from the mechanical cell linkage. Gas flow (6) (for example, fuel gas) flows from the top downward on the right-hand and left-hand side and horizontally through the disposed cell elements on the associated electrode side (1). Gas flow (7) (for example, air) flows from the bottom upward and horizontally through the electrode chambers past the counterelectrode (3), always at right angles to gas flow (6). In the chamber (7a), the gas flow (7) emerges from the plane of the figure, and in chamber (7b) it enters the plane of the figure. The chambers (7a) and (7b) are interconnected by lateral channels, which are not shown, and offset by 90° relative to the vertical channels of the gas flow (6) shown.

In the example chosen in FIG. 3, the individual elements are on rectangular plates. Identical electrodes face one another in each case ((3) to (3), (1) to (1)), and this makes unnecessary a structured metal plate (interconnector) for electrical contacting and gas separation, such as is described, for example, as essential inventive element in U.S. Pat. No. 4,721,556.

To connect the individual elements in series, use is made of the contacts (A), (B), (C) and (D) which are brought to the outside and are electrically insulated from one another by the insulating elements (4). Contacts (A) and (D) are respective edge regions (14), and contacts (B) and (C) are respective contact parts (5).

The dimensions of the chambers for the air flow and fuel gas flow (gas flows (6), (7)) are fixed by the dimensions of the insulating elements (4) in such a way that the mass flows are able to flow through the fuel batteries in a specifically set ratio. The air mass flow should be at least five times the fuel mass flow.

The manufacture in accordance with the invention of the individual cells and their linking to form fuel cell batteries is explained in greater detail by reference to two examples.

EXAMPLE 1

Disposed at a distance from one another on a cylindrical body, diam. 20 mm, are annular metal parts (14), which distance corresponds to the porous region (12) of metallic edge regions support. The free spaces to be porous parts (12) are provided and are connected to a sturdy metal sprayed layer by a vacuum plasma coating of powder of the same metal alloy as annular parts, edge regions metal (14). The particle size fraction of the powder is between 15 and 125 $\mu$m, in which connection, for a mean pore size of 25 $\mu$m, about 20% of the powder particles should be smaller than 32 $\mu$m and about 40% larger than 62 $\mu$m. The total porosity for this application example is 40%.

After realignment of the patterning masks, the electrolyte layer (2) is sprayed onto the porous region (12) of metal electrode (1) and a part of the annular metal parts, edge regions (14), again using the VPS process. The spraying powder is very fine-grained so as to produce the necessary sprayed i layer density. For a leakage rate $\leq 10^{-6}$ mbar.l/cm.s (measured with helium), a powder having a particle size of 6–16 $\mu$m is necessary. The residual leakage rate is homogeneously distributed over the electrolyte area and is composed of very many tiny individual leaks. The gas permeability is not more than 15%, so that at least 85% of the fuel gases are electrochemically converted.

After a further realignment of the patterning masks, the counterelectrode (3) can be sprayed on, again optimized in its porosity in accordance with the conditions of the gas supply and removal and matched in the layer thickness to the type of contact envisaged. If the counterelectrode (3) is cathode )oxygen side), a perovskite layer is preferably sprayed on. In the case of the counterelectrode (3) as anode (fuel gas side), it is preferably composed of a Ni/$ZrO_2$ mixture or of NiO.

The essential coating parameters for all 3 layers are listed in the table below.

| Parameter | Support | Electrolyte | Counter-electrode |
|---|---|---|---|
| Powder | NiCrAlY | $ZrO_2$ + 12% $Y_2O_3$ | Ni/$ZrO_2$ |
| Particle size range | 15–125 $\mu$m | 6–16 $\mu$m | 6–75 $\mu$m |
| Chamber pressure | 120 mbar | 40 mbar | 80 mbar |
| Plasma current | 800 A | 680 A | 740 A |

-continued

| Parameter | Support | Electrolyte | Counter-electrode |
|---|---|---|---|
| Plasma gas | Ar/He | Ar/H | Ar/H |
| Layer thickness | 2-5 mm | 100 μm | 0.5 mm |
| Contacting | transverse conductivity plus thin perovskite layer | | edge contact |

After the coating, an He leak check is carried out before the battery assembly is performed. The tested individual elements are assembled to from the tubular battery and are interconnected electrically in series in a gastight manner in accordance with the prior art. Since the electrical contacting of the counterelectrode (3) can be checked after the assembly, a thick layer with adequate transverse conductivity which only has to be contacted at one point is preferred.

EXAMPLE 2

To provide porous region (12), porous metal areas are sintered into planar metal plates (1) having dimensions of 100×100 mm and made of ferritic steel. As in Example 1, the electrolyte layer (2) and the counterelectrode (3) are deposited one after the other using the VPS process. After a . visual check of the individual elements, the He tightness is measured for every plate and the contacting of the counterelectrode (3) is prepared. Area contacting and adequate transverse conductivity are preferred. The two gas supply levels are dimensioned with the aid of insulating elements (4), i.e. ceramic spacers (4), and are mutually sealed in a gastight manner. At this point it becomes particularly clear that the avoidance of the mechanical frictional connection between active cell region (12, 2, 3) and edge structure (4, 5, 14) ensures the resistance to thermal cycling in continuous operation.

What is claimed is:

1. A fuel cell for a fuel cell battery, comprising:
    an active cell element comprised of a support electrode, a counterelectrode, and an electrolyte layer positioned between the support electrode and the counterelectrode,
    wherein the support electrode supports the active cell element and includes an edge region, a spring-loaded region, and a porous region provided between the edge region and the spring-loaded region, the support electrode being composed of a metallic substance and the edge region, porous region and spring-loaded region of the support electrode being composed of the same metallic substance, and wherein the support electrode has a thickness effective to provide a transverse electrical conductivity which is effective to produce a uniform electrochemical reaction homogeneously distributed over the electrolyte layer,
    wherein the spring-loaded region mechanically decouples the active cell element of the fuel cell for a fuel cell battery from frame structure thereby protecting the electrolyte layer from thermally induced mechanical stresses produced by differing coefficients of expansion of materials,
    wherein the counterelectrode is porous and composed of a metallic substance, and
    wherein the electrolyte layer is gastight and is composed of an oxide.

2. The fuel cell for a fuel cell battery according to claim 1, wherein the support electrode is comprised of at least one flat metal plate having a shape which is one of round or rectangular, having a thickness which is at least effective to withstand mechanical stresses to which the support electrode is to be exposed, and wherein the edge region has a thickness which is at least twice as thick as the thickness of the at least one metal plate.

3. The fuel cell for a fuel cell battery according to claim 1, wherein the support electrode has a shape which is cylindrical and has an internal diameter which ranges from 1 to 5 cm.

4. The fuel cell for a fuel cell battery according to claim 1, wherein the spring-loaded region of the support electrode extends and surrounds the active cell element on all sides.

5. The fuel cell for a fuel cell battery according to claim 1, wherein the porous region of the support is produced by thermal spraying of a powder of the metallic substance of the support electrode, the powder having a particle size wherein the porous region has at thickness corresponding at least to that of the support electrode, and wherein the porous region has a porosity which is selected by selecting the particle size of the powder which is thermally sprayed.

6. The fuel cell for a fuel cell battery according to claim 5, wherein the powder has a particle size ranging from 15 to 125 μm, and wherein about 20% of the particles have a particle size below 32 μm and about 40% of the particles have a particle size above 62 μm thereby producing a porosity of 40% and a mean pore size of about 25 μm.

7. The fuel cell for a fuel cell battery according to claim 5, wherein thermal spraying is vacuum plasma spraying.

8. The fuel cell for a fuel cell battery according to claim 1, wherein the support electrode is composed of a metallic substance which is a high-temperature alloy, wherein the support electrode may be a cathode or an anode, and wherein the metallic substance for the support electrode is selected in dependence upon the atmosphere to be encountered in use, which atmosphere is selected from the group consisting of an oxygen-containing gas and a fuel gas.

9. The fuel cell for a fuel cell battery according to claim 1, wherein the porous region of the support electrode is incorporated into the support electrode by sintering a powder of the metallic substance, and wherein the porous region has a porosity which is a function of at least one of the sintering powder and sintering conditions.

10. The fuel cell for a fuel cell battery according to claim 8, further comprising a boundary layer provided between the support electrode and the electrolyte layer to at least one of improve the electrical contact therebetween or catalytically accelerate the electrochemical reaction, and having a thickness ranging from about 1 to about 10 μm.

11. The fuel cell for a fuel cell battery according to claim 10, wherein the support electrode is a cathode, and wherein the boundary layer is composed of perovskite.

12. The fuel cell for a fuel cell battery according to claim 1, wherein the electrolyte layer is composed of at least one metal oxide, and wherein the electrolyte layer is provided directly onto at least the porous region of the support electrode and has at thickness which does not exceed 100 μm, whereby an effective oxygen ion conductivity, gas-tightness, and adequate insulation against electron conduction are simultaneously provided.

13. The fuel cell for a fuel cell battery according to claim 12, wherein the electrolyte layer is produced by vapor plasma spraying of a powder composed of cubic $ZrO_2$ containing 12% by weight of $Y_2O_3$ which thereby stabilizes the cubic $ZrO_2$ and has a particle size ranging from 6 to 16 μm whereby a dense finely lamellar electrolyte layer structure is produced having a homogeneous residual leakage rate of below $10^{-6}$ mbar.l/cm.s over the electrolyte layer.

14. The fuel cell for a fuel cell battery according to claim 13, wherein the residual leakage rate is such that no more than 15% of fuel gas burns in a uniformly distributed manner over the surface of the electrolyte layer so that a temperature favorable for oxygen ion conductivity is established in the electrolyte layer and so that the thermal production of CO by internal reforming from $CH_4$, $CO_2$ and $H_2O$ are simultaneously obtained.

15. The fuel cell for a fuel cell battery according to claim 1, wherein the counterelectrode is deposited directly onto the electrolyte layer by thermal spraying of a powder, and wherein the counterelectrode has a porosity which is a function of at least one of the powder and deposition parameters.

16. The fuel cell for a fuel cell battery according to claim 15, wherein the counterelectrode has a porosity of 40% and a mean pore size of 25 μm.

17. The fuel cell for a fuel cell battery according to claim 15, wherein the powder to be thermally sprayed is composed of a mixture of Ni and $ZrO_2$, whereby a cermet layer is produced having a percent by volume of Ni ranging between 25 and 75%, and wherein the mixture has a particle size ranging from 6 to 75 μm.

18. A fuel cell battery, comprising:
a frame structure; and
a plurality of fuel cells which are interconnected with the frame structure and with one another in a gastight manner, and which are electrically connected to one another in series, each fuel cell being comprised of:
an active cell element comprised of a support electrode, a counterelectrode, and an electrolyte layer positioned between the support electrode and the counterelectrode,
wherein the support electrode supports the active cell element and includes an edge region, a spring-loaded region, and a porous region provided between the edge region and the spring-loaded region, the support electrode being composed of a metallic substance and the edge region, porous region and spring-loaded region of the support electrode being composed of the same metallic substance, and wherein the support electrode has a thickness effective to provide a transverse electrical conductivity which is effective to produce a uniform electrochemical reaction homogeneously distributed over the electrolyte layer,
wherein the spring-loaded region mechanically decouples the active cell element of the fuel cell for a fuel cell battery from frame structure thereby protecting the electrolyte layer from thermally induced mechanical stresses produced by differing coefficients of expansion of materials,
wherein the counterelectrode is porous and composed of a metallic substance, and
wherein the electrolyte layer is gastight and is composed of an oxide,
wherein the spring-loaded region of each fuel cell for a fuel cell battery is connected to the frame structure to provide a mechanical frictional connection therebetween which is decoupled thereby protecting the electrolyte layer from thermally induced mechanical stressed produced by differing coefficients of expansion of materials.

19. The fuel cell battery according to claim 18, further comprising a plurality of contact assemblies each comprised of a contact part which is metal, an insulating element, and a sprung part, the insulating element connecting the contact part to the sprung part, and wherein each fuel cell for a fuel cell battery is tubular and has an edge region extending from the support electrode, and wherein the edge region of the support electrode of one fuel cell for a fuel cell battery is electrically connected in series with the counterelectrode of a next fuel cell for a fuel cell battery by one contact assembly of the plurality of contact assemblies, the edge region of the support electrode being connected to the contact part of the contact assembly and the counterelectrode contacting the sprung part of the contact assembly, whereby electrical insulation between support electrodes of adjacent fuel cells is provided by the insulating element of respective contact assemblies.

20. The fuel cell battery according to claim 19, wherein a plurality of chambers are defined within the fuel cell battery through which flow, respectively, a fuel gas and an oxygen-containing gas in a selected mass flow ratio.

21. The fuel cell battery according to claim 20, wherein the selected mass flow ratio is provided by selecting dimensions of insulating elements, and wherein the insulating elements are dimensioned so that the mass flow ration provides a flow of air which ranges up to ten times the flow of fuel gas.

22. The fuel cell battery according to claim 18, further comprising a plurality of contact assemblies each comprised of an insulating element and a sprung part connected to one another, each sprung part contacting a counter-electrode and each insulating element contacting an edge region of a support electrode, wherein each fuel cell for a fuel cell battery is planar, and has a shape which is one of round or rectangular, and wherein the plurality of fuel cells are connected together using planar technology so that support electrodes of adjacent fuel cell for a fuel cell battery are electrically connected in series through contact points which are extended outside of the fuel cell battery, the contact points comprising edge regions of support electrodes and sprung parts of contact assemblies, the edge region of the support electrode of one fuel cell for a fuel cell battery being electrically connected in series through a sprung part to the counterelectrode of a next fuel cell for a fuel cell battery.

* * * * *